Jan. 4, 1966 L. T. CRANE, JR 3,228,011

METHOD OF OPERATING SUPERCONDUCTIVE COMPUTER ELEMENTS

Filed Dec. 31, 1962 2 Sheets-Sheet 1

LANGDON T. CRANE, JR.
INVENTOR
BY John R. Faulkner
Stuart Lubitz
ATTORNEYS

METHOD OF OPERATING SUPERCONDUCTIVE COMPUTER ELEMENTS

Filed Dec. 31, 1962 2 Sheets-Sheet 2

LANGDON T. CRANE, JR.
INVENTOR
BY John R. Faulkner
Stuart Lubitz
ATTORNEYS

United States Patent Office 3,228,011

Patented Jan. 4, 1966

3,228,011

METHOD OF OPERATING SUPERCONDUCTIVE COMPUTER ELEMENTS

Langdon T. Crane, Jr., Birmingham, Mich., assignor to Ford Motor Company, Dearborn, Mich., a corporation of Delaware Filed Dec. 31, 1962, Ser. No. 248,485
4 Claims. (Cl. 340—173.1)

The invention described herein is a bi-stable element suitable for use in either memory or logic circuits of a high speed computer. The operation of this bi-stable element is derived from the properties of thin films, as opposed to bulk superconductors. The following discussion of superconductivity is provided for the purpose of setting forth the different behavior of thin film and bulk superconducting materials and to aid in the understanding of the unique features of this device.

*Superconductivity*

It has been known since the experiments of H. Kammerlingh-Onnes in 1911 that certain materials lose all of their electrical resistance at low temperatures. Such materials are called superconductors. The property of superconductivity is found in certain alloys and certain intermetallic compounds as well as in certain pure metallic elements. These materials have a much higher electrical resistivity than silver and copper at room temperature and are thus not normally used as conductors of electricity. When the temperature of such a material is reduced to a sufficiently low value, it undergoes a transition from its normal (or resistive) state to the nonresistive superconducting state. This transition occurs within a narrow range of temperature, generally less than $5 \times 10^{-2}$° Kelvin in span. In homogeneous specimens the entire transition occurs in a few thousandths of a degree (Kelvin) of temperature. The transition is always found to occur at the same temperature for any given specimen and thus there is said to be a transition or critical temperature below which the material is superconducting and above which it is normal or resistive. The composition of the material is the most important factor in determining the critical temperature, but crystal grain size, strain, and impurity content can produce large changes in the critical temperature of a material.

The critical temperature can also be strongly influenced by magnetic fields applied to the material and/or electric currents conducted by the material. The critical temperature for a given material is, therefore, assumed to be the temperature of the normal-to-superconducting transition with no magnetic field present and no current flowing through the material. On the other hand, for any temperature below the critical temperature there exists a finite magnetic field intensity which is sufficient to force the superconducting material to revert to its normal resistive state. The value of the magnetic field intensity which is sufficient to cause such a transition is called the critical field at the temperature which has been specified. The critical field is found to decrease monotonically to zero as the temperature of a specimen is raised from absolute zero to the critical temperature for zero applied field and current. As with the critical temperature, the value of the critical field at any temperature is predominantly determined by the composition of the material. FIGURE 1 shows the typical variations of critical field with temperature. $T_c$ is the critical temperature, $H_c(T)$ is the critical field at temperature T and $H_c(O)$ is the critical field at absolute zero. Thus at some temperature $T=a$, the material remains superconducting as long as the material is not subjected to a magnetic field intensity equal to (or greater than) $H_c(a)$. If fields stronger than $H_c(a)$ are applied, the material reverts to the normal state and remains resistive as long as the field exceeds $H_c(a)$.

A relation similar to the one outlined above exists for the case when the material is conducting a current at temperatures below the critical temperature. At any given temperature there is a finite current which is sufficient to restore the material to the electrically resistive state. The amount of current is termed the critical current (at a given temperature) and is primarily a function of the composition of the superconducting material.

Arguments on the basis of thermodynamics can establish that in bulk superconductors there is a relationship between critical current and critical field. Keeping in mind that electrical currents produce magnetic fields, the essential point in such an argument is that the experimentally measured value of the critical current for a specimen of material is always just sufficient to generate a critical magnetic field at the surface of that material. Since currents and fields are always related to one another (i.e. any magnetic field can be represented as a spatial distribution of electrical currents on the basis of the laws of electromagnetism, without any reference to superconductivity), Silsbee hypothesized that the electrical current flow did not destroy superconductivity in a specimen; it was simply the magnetic field produced by the current flowing in the specimen which could destroy superconductivity.

Present measurements of critical currents in very thin specimens would seem to indicate, however, that there is a critical electron velocity which cannot be exceeded in superconducting material. If the electrons are accelerated to velocities greater than the critical value of velocity, the material must transform from the superconducting to the normal state. Thus there are three criteria which determine whether a potentially superconducting material is in the superconducting state: (1) the temperature must be below the critical temperature; (2) the magnetic field strength (regardless of whether the magnetic field is produced by current flowing in the material or by the application of a magnetic field) must be below the critical field value; and (3) the net velocity of the current carrying electrons in the material must be below the critical velocity. In bulk materials the third criterion is not apparent.

The magnitude of an electrical current is simply $NevA$, where N is the number of electrons per unit volume of material, $e$ is the electrical charge per electron, $v$ is the net velocity of the electrons and A is the cross-sectional area of material available for current flow. In any given superconducting material (at a given temperature) N is unchanged by the dimensions of the material, as is $e$, which is the same for all electrons. To carry a given value of current, the product of velocity $v$ and cross-sectional area A must be a constant. If the value of A is reduced, the velocity must then be proportionately larger for the current to remain unchanged. If a superconductor is thick, as in a bulk specimen, enough cross-sectional area is available so that the total current flowing in the material can be made large enough to generate critical magnetic fields at the surface of the material without the electron velocity having to exceed the critical velocity. The critical velocity is not, therefore, an important criterion in bulk specimens. In the case of a thin film, the cross-sectional area can be made as small as desired, and electrical currents are limited by the critical velocity before achieving large enough values that critical magnetic fields are produced. The critical velocity will differ for materials of differing composition, but the important point is that the amount of current which can flow in a superconductor can be limited by making the material sufficiently thin and thereby reducing the cross-sectional area.

Another point worth noting is that the critical field value increases with decreasing thickness for fields applied perpendicular to the thin dimension of a thin film. This effect is well known and will not be developed further here. From this and the above remarks relating to the current carrying capacity of a thin film, it can be seen that in a thin film the critical current may be reduced and the critical field may be increased. Since the stability of superconducting devices requires that magnetic fields be kept very small compared to the critical field, this limitation of critical currents of values which generate only small magnetic fields is extremely important to the successful operation of a practical device. If relatively large magnetic fields were generated by the currents flowing in a superconducting device, the superconducting material might be driven back into the resistive state by the currents carried in the material. In the instant invention, the film is thin enough that the critical field is increased and the critical current is reduced.

*Prior art*

Several devices for computers have been disclosed recently which basically depend for their operation upon the establishment of a flow of electrical current in a loop of superconducting material, as does the instant device. Such devices are shown in U.S. Patents 3,043,512, issued to M. F. Buckingham et al. on July 10, 1962 and 2,983,-889, issued to M. W. Green on May 9, 1961 and the publication of "Trapped-Flux Superconducting Memory" by J. W. Crowe, IBM Journal of Research and Development, volume 1, Number 4, pp. 295–303, October 1957. The devices described in these publications all require that a part of the electrical circuit be driven into the normal or resistive state to store a persistent current. Once the resistive state is re-established in the device, heat is generated. This generated heat must always be conducted away from the device before the superconductive state can be re-established. A certain period of time is required to remove this heat. Thus any device which requires a transition from the superconducting state to the normal state of necessity is slow in its switching action. In fact, the switching times in these devices are often longer than the switching time of devices presently used in computers. Further, the necessity of the restoration of resistance in these devices has required the use of somewhat more complex embodiments.

The above-mentioned deficiencies can only be remedied if a device makes specfic use of the current limiting properties offered by thin film superconductors. These thin film properties of current limitation were only recently discovered [See J. E. Mercereau and L. T. Crane, "Physical Review Letters," 9, 381 (1962)] and they allow a persistent current to be stored in either direction without interruption of the superconducting state of the device.

The essential novel feature of the instant invention is that it is self-limiting in electrical current without ever leaving the superconducting state. Former devices could not take advantage of this type of current limitation because they were specifically-designed to produce a transition from the superconducting to the normal state in order to perform switching operations. All of the devices mentioned could have been fabricated from thin film materials, but none could possibly take advantage of the critical current limitation by a thin film material in the superconducting state.

In fact, one specific reason why different switching techniques has been used in the past is that critical currents were believed to be about 100 times larger in thin films than was recently found possible to achieve by practical induction techniques. This is because the critical velocity limitation was not fully appreciated. Before it was realized that the critical current could be made quite small in a thin film superconductor, it appeared necessary to apply large magnetic fields to superconducting rings in order to induce critical currents in those rings. For instance, in a circular ring of circular wire it can be shown (approximately) that when neglecting the critical velocity limitation $$B_a = 26 \times \left(1n\frac{8r}{R} - 2\right) \times \frac{R}{r} \times B_c$$

where $B_a$ is the field in gauss which must be applied to the area subtended by the ring to induce a critical current in the wire, $r$ is the radius of the ring in centimeters, R is the radius of the wire in centimeters and $B_c$ is the critical magnetic field in gauss. This equation shows that until the ratio of $R/r$ becomes extremely small (about $10^{-4}$) the values of $B_a$ are too great to be practical in a working device. Thus methods of switching have been utilized which are basically different from that proposed here.

*The invention*

With the principles of superconductivity and the distinctions between bulk devices and thin film devices in mind, the invention can be fully appreciated. The seed of the invention evolved from a series of laboratory experiments investigating the nature of thin film superconductors. In conducting the experiments a thin film ring was constructed and a sensor coil was placed concentrically within the ring while a field coil was placed around the circumference of the ring. The temperature of the thin film was reduced to approximately 2° Kelvin and a voltage was applied to the field coil causing a magnetic flux to be directed against the subtended area of the thin film ring. The applied field induced a current in the ring which caused a magnetic field that canceled the applied field and consequently a flux was not transmitted to the sensor coil and a voltage was not induced therein. A surprising phenomenon resulted when the field was increased. Normally it would be expected that once the applied field reached a value which would induce the critical current, a further increase in the applied field would induce a greater current, that is, one exceeding the critical current, and thus revert the thin film to the normal state. The normal state would cause a resistance that would, for all practical purposes, eliminate any current in the ring. This bit of scientific logic would, of course, lead one to the conclusion that no useful result would be accomplished by further increasing the magnetic field applied to the thin film ring. In face of these facts, the applied magnetic field was increased and it was found, surprisingly, that the current induced in the thin ring remained at the critical value and the thin film remained superconductive [See J. E. Mercereau and L. T. Crane, "Physical Review Letters," 9, 381 (1962)]. This constant critical current permits an uncanceled amount of flux to exist as the field increases. The uncanceled flux may induce a voltage in the sensor coil. This discovery was pursued further and a circuit element was devised and more particularly a computer memory element.

The computer element or memory element, which has become known as the "Cranium," comprises a thin film ring, a sensor coil and a field coil. The driving of the thin film ring by the field coil with a field (2H*a*), which is twice the field (H*a*) required to induce the critical current, places the ring at the state shown as point A in FIGURE 2. It should be understood from FIGURE 2 that the induction of current in the ring, because of the self-limiting current characteristic, ceases at point B when the critical current value ($I_c$) is reached and remains constant while the flux continues to rise. By now reducing the flux to zero a current ($-I_c$) (the critical current value flowing in the reverse direction) is induced in the ring which will persist and may be representative of a stored bit of information. To read the bit of information from the memory it is only necessary to apply a voltage to the field coil in a direction that would induce a current in the same direction as the stored critical current. Since the ring already has a constant critical current in the same direction stored therein, the field created by the coil will be free to induce a voltage in the sensor coil indicating a stored bit of information. If the current stored in the memory is opposed to the current which the field coil attempts to induce, the currents will initially cancel each other and consequently there will be no resultant field available to induce a voltage in the sensor coil. The sensing field is terminated when the canceling induced current is in the region of the critical value ($+I_c$). The termination of the field at this point prevents any significant signal arising from the uncanceled flux which will exist when a magnetic field is applied in excess of that necessary to induce the critical current. The failure of a voltage to be induced in the sensor coil at the appropriate time will indicate that a different bit of information is stored.

It should be noted that other researchers have utilized pulse coils, thin films and sensor coils in combination (see J. W. Crowe, "Trapped-Flux Superconducting Memory," IBM Journal of Research and Development, volume 1, Number 4, pp. 295–303, October 1957) but none have utilized the straightforward and simple approach embodied in this invention. This approach has been apparently overlooked because the fact that the thin film superconductor remains superconductive when driven with a field larger than necessary to induce a critical current has not been known heretofore.

The superconductive computer element generally described above in addition to being extremely simple provides a number of other important advantages such as:

(1) The switching time of the device appears to be theoretcially limited only by the rate at which an appropriate magnetic field can be applied;

(2) There are no resistive contacts which might interfere with the superconductivity of the elements attached to this thin film;

(3) The operation of the device is at a temperature which lies within the shaded region of the critical current density curve shown in FIGURE 3. In this region of the operation the critical current density is substantially constant regardless of the temperature variations. The computer element is, therefore, not sensitive to temperature changes and remains superconductive in spite of any temperature changes that might be attributed to energy conversion;

(4) The problem of heat transfer is of no concern since the instant device is always superconductive and only exceedingly small amounts of heat are generated;

(5) The magnitude of the field applied to the switching device is not subject to a narrow critical tolerance; and (6) The computer element can perform any of the logical computer operations and may be applied to number systems other than the binary system.

The stuctural aspects of the invention and other advantages will be readily understood when the detailed written description is read in conjunction with the drawings wherein.

Figures 1, 2, 3, 4, 5:
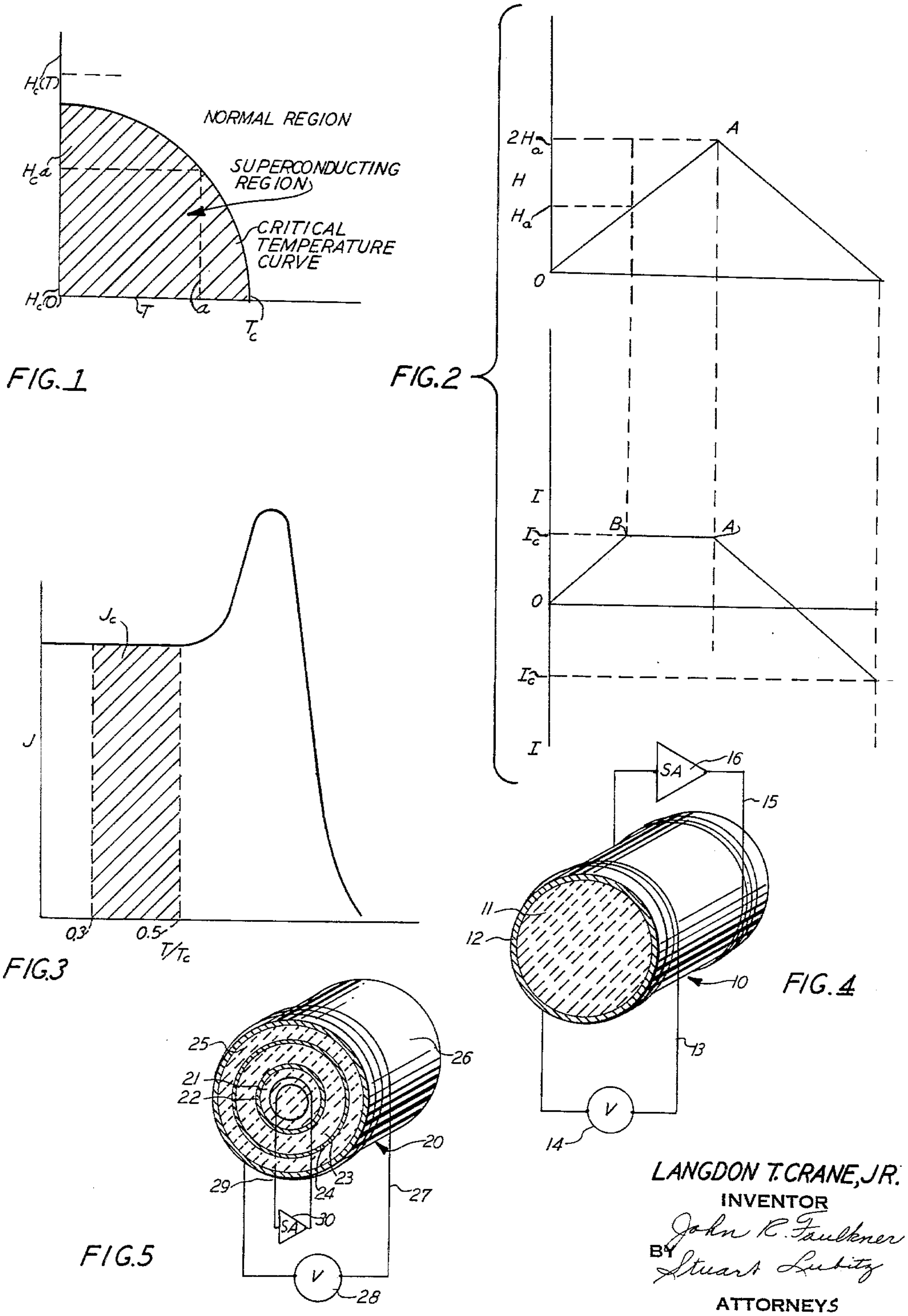
FIGURE 1 shows a typical critical temperature curve wherein the applied magnetic field is plotted against temperature.
FIGURE 2 is a graph of the applied magnetic field and the induced critical current plotted against time.
FIGURE 3 shows a typical thin film critical current density curve wherein the current density is plotted against the ratio of temperature to critical temperature.
FIGURE 4 is a schematic diagram of a typical thin film circuit component.
FIGURE 5 is an alternate embodiment of a thin film circuit component constructed in accordance with the invention.

Referring to FIGURE 4, a computer element or more specifically a memory element 10 comprises a glass or quartz rod 11 having a thin film 12 plated around its circumference. The thin film 12 may be made from any of the well-known superconductive materials such as lead, tin, niobium, vanadium or various alloys. The thin film 12 may be coated with another material so that oxidation would be prevented, if the particular material utilized poses an oxidation problem. In this embodiment of the invention the thin film ring 12 is made of a single composition. It is, however, within the broad scope of the invention to utilize an assortment of compositions to obtain various switching rates and effects. In FIGURE 4, the dimensions of the superconductive computer element 10 have been exaggerated in order to properly show the details of the structure. In reality the diameter and length of the ring can be made very small and consequently a great many of the rings may be placed in a relatively small volume.

A pulsing coil 13 is wound around the circumference of the thin film 12. This coil 13 is connected to a voltage pulse source 14 which may be any of the well-known voltage pulsing devices. The particular characteristics of the pulse may be selected according to the intended application. It presently seems feasible that pulses having a rise time of $10^{-13}$ seconds may be utilized and, of course, pulses having slower rise times may certainly be utilized. The particular number of turns of the coil 13 and the arrangement of the coil on or near the circumference of the thin film ring are design features which one of ordinary skill in the art is capable of determining. It should be noted that the coil is arranged so that the magnetic field is applied perpendicular to the thin dimension of the thin film ring 12. This fact is significant since the critical magnetic field perpendicular to the thin direction is greater than the critical field in the direction perpendicular to the circumference of the thin film ring 12. The fact that the critical field is larger in the direction perpendicular to the thin dimension enables larger magnetic fields to be applied to the thin film ring without significantly affecting the superconductivity of the thin film ring. It is within the scope of the invention to apply a magnetic field to the thin ring by any of the well-known magnetic field generating means.

A sensing coil 15 is also placed around the circumference of the thin film ring 12 and connected to a sensing amplifier 16. A coil 13 may also be arranged in various manners other than as shown, such as concentric with the field coil and inside of the ring or between the field coil and the ring. Sensing amplifiers are well known in the computer art and any suitable sensing amplifier may be utilized in conjunction with the instant invention.

A laboratory model of the superconductive memory element was constructed and a thin film ring of tin 1770 angstroms thick was utilized. This ring was 0.0394 inch long and 0.394 inch in diameter and evaporated onto a glass tube. The sensing coil was made of 0.001 inch copper wire and had 2400 turns. This coil had a 0.290 inch outside diameter, a 0.200 inch inside diameter and a length of about 0.125 inch. This coil was fitted on the inside of the glass tube on which the ring was evaporated. The field coil was 100 turns of No. 20 copper wire wrapped in two layers. It was about 1½ inches long and 4 inches in diameter. By applying a voltage pulse causing a magnetic field having an amplitude of 2.5 gauss and a rise time of $10\mu$ seconds a maximum current of about one ampere was induced in the thin ring. The ring was at a temperature of 1.5° Kelvin which is 0.4 of the critical temperature and within the preferred range of operating temperatures of approximately 0.3 to 0.5 $T_c$.

Figure 6:
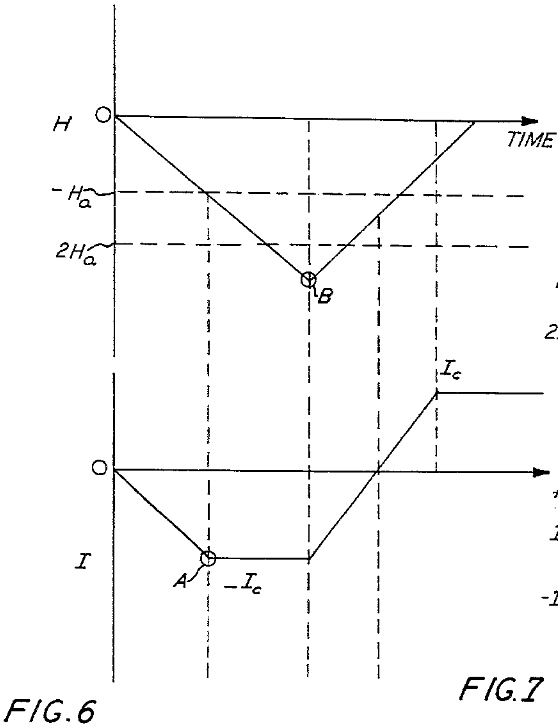
FIGURES 6 and 8 are graphs of the applied magnetic field and induced current during the read-in phase of the operation of a typical thin film memory element.

The operation of the memory element 10 can best be understood by reference to FIGURES 6–9. FIGURE 6 depicts the manner in which a one is stored in the superconductive memory element. The magnetic field intensity (H) is initially at zero as is the induced current (I). The magnetic field intensity (H) is then increased in a negative direction by application of a voltage to the coil 13. The applied voltage causes a magnetic field to be directed against the area subtended by the thin film ring 12. This magnetic flux induces a current in the thin film ring 12 which causes a flux that opposes and cancels the applied flux. The induced current, as indicated in FIGURE 6, increases in the negative direction until the critical current ($-I_c$) and magnetic field intensity ($-Ha$) is reached at point A. The further increase of the magnetic field intensity does not substantially affect the induced current which remains at the critical current value ($-I_c$). Further increase of the magnetic field intensity does not drive the thin film ring into the normal state but rather it remains in the superconductive state. The magnetic field intensity (H) reaches its maximum value at point B which may be any value greater than $-2Ha$. At this point the magnetic field intensity is decreased and consequently the induced current which has been at the critical value ($-I_c$) is reduced and a positive critical current ($I_c$) is induced in the thin ring 12. It is apparent that the applied magnetic field intensity is now zero and a positive critical current is stored in the thin film ring 12. This positive critical current may be representative of a stored bit of information. In the preferred embodiment the positive critical current is representative of the one state or value in a binary numerical system.

It should be understood that in the above description the superconductive element initially did not have any information stored in it. Under normal operating conditions a zero or one state would normally exist. The principles described in the above example will apply regardless of the state of the superconductive element. For example if a one state exists and it is desired that a zero state be stored, that is a negative critical current, it is only necessary to pulse the voltage coil 13 so that a magnetic field of $2Ha$ is created and then reduced to zero.

Figure 7:
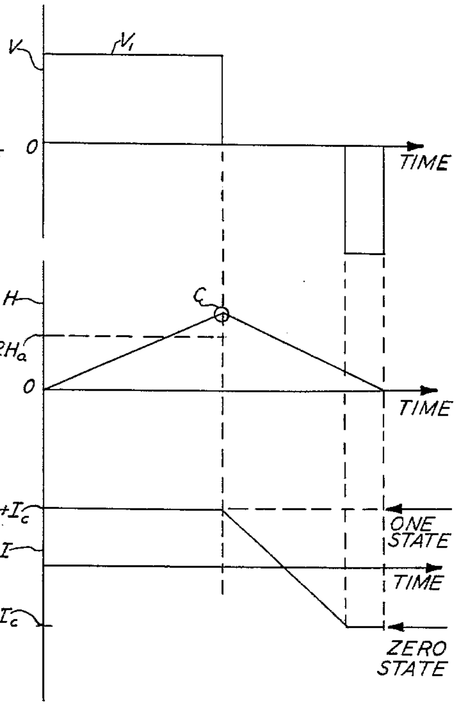
FIGURES 7 and 9 are graphs of the applied magnetic field, the induced current and the sensor coil voltage during the read-out phase of the operation of a typical thin film memory element.

Referring to FIGURE 7 the memory element 10 may now be interrogated by applying a voltage to the coil 13 which will cause a magnetic field in the positive direction. When such a voltage is applied, the flux incident to the magnetic field (H) will not be canceled since the thin film ring 12 has stored a critical current and no additional current will be induced in the thin film ring and consequently there will be no additional canceling flux. The flux caused by the interrogating pulse is, therefore, immediately able to induce a voltage ($V_1$) in the sensing coil 15 and the sensing amplifier 16, thereby indicating that a value of one is stored in the thin film ring. The magnetic field intensity is increased to point C and then decreased to zero. When the magnetic field intensity is decreased to zero, the critical current stored in the thin film ring 12 will assume a negative direction and the thin film ring will have a zero state. A proper pulse will again store the one value in the thin film ring 12.

Figure 8:
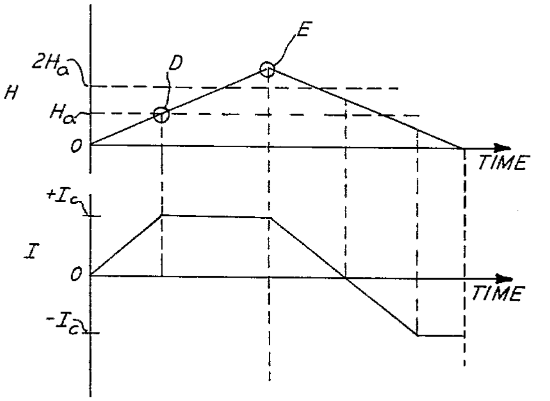
Figure 9:
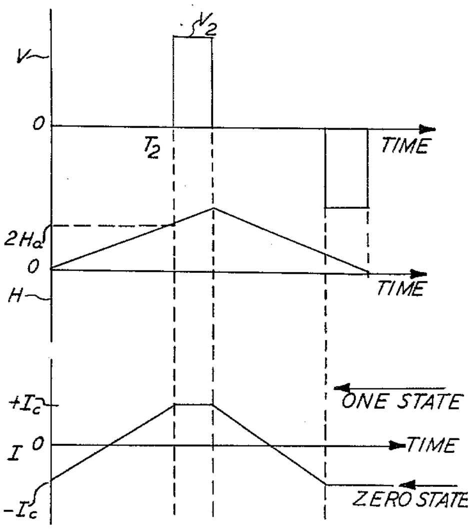

FIGURES 8 and 9 indicate the method of storing and reading a zero value in the thin film ring 12. To store a zero value a magnetic field intensity (H) is first increased in a positive direction by application of a voltage to the coil 13. The magnetic flux incident the magnetic field induces a current in the thin film ring 12 which causes a flux that opposes and cancels the applied flux. The induced current, as shown in FIGURE 8, increases in the positive direction until the critical current ($I_c$) and the magnetic field intensity ($Ha$) is reached at point D. The further increase of the magnetic field intensity does not substantially affect the induced current, thus remaining at the critical current value ($I_c$). Further increase of the magnetic field intensity does not drive the thin film ring into the normal state; instead the thin film ring remains in the superconductive state. The magnetic field intensity (H) reaches its maximum value at point E which may be any value greater than or equal to $2Ha$. At this point the magnetic field intensity is decreased to zero and consequently the induced current ($I_c$) is reduced and a negative critical current ($-I_c$) is induced and stored in the thin ring 12. This stored negative critical current may be representative of a bit of information. In the instant embodiment, the negative critical current is representative of the zero state or value in a binary system.

Referring to FIGURE 9, the memory element 10 may now be interrogated by applying a voltage to the coil 13 which will cause a magnetic field in the positive direction. The magnetic flux incident to the magnetic field will initially cancel the negative current stored in the ring and then induce a critical current in the positive direction. As the magnetic field intensity is increased from zero to $2Ha$, the current in the ring goes from a $-I_c$ value to a $+I_c$ value and consequently there is no flux available to induce a voltage in the sensing coil 15. The flux created when the magnetic field intensity rises above the $2Ha$ value produces a voltage ($V_2$) in the sensing coil later in time ($T_2$) than if the element were in the $+I_c$ state. After the magnetic intensity has reached a value slightly greater than $2Ha$, the field is then decreased to zero, thus restoring the memory element to its original zero state.

From the above detailed description it is readily apparent that a bi-stable computer element has been provided that is readily adaptable to form a computer memory. There are many techniques that can be derived for pulsing the disclosed superconductive element, thereby reading in and reading out information. Various shapes of applied field could be selected so that upon read-out a selected voltage level would indicate a one value and another voltage level would indicate a zero value. Since pulse techniques are well known by computer engineers of ordinary skill, further development here of such techniques is thought to be unnecessary.

In FIGURE 5 another application of the instant invention is shown. This embodiment of the invention demonstrates the utilization of the computer element 10 as the basis for a computer memory element that operates on a number system other than the binary system.

The computer element 20 comprises a glass or quartz rod 21, a first thin film ring or coating 22 made of a superconductive material, a first glass or quartz coating or tube 23, a second superconductive thin film ring or coating 24, a second glass or quartz coating or tube 25, and a third superconductive thin film ring or coating 26. A pulse coil 27 is placed around the circumference of the thin film ring 26 and connected to the voltage pulse source 28. A sensing coil 29 is located in the proximity of the glass rod 21 and connected to a sensing amplifier 30. The thin film rings 22, 24 and 26 are spaced so that a magnetic field having an intensity of $2Ha$ will only induce a critical current in the thin film ring 26 and magnetic field intensities having the values of $4Ha$ and $6Ha$ will induce critical currents in thin film rings 24 and 22 respectively.

The above embodiment of the invention can readily be understood by considering the readout operation after a positive critical current has been stored in the thin film ring 26 by the application of a magnetic field intensity having a value of approximately $2Ha$. To interrogate the three ring elements a field slightly greater than $6Ha$ is applied. Since a critical current exists in thin film ring 26 the application of a magnetic field first induces a positive critical current in a thin film ring 24 and then induces a positive critical current in the thin film ring 22. At this time the magnetic field intensity would be at a value of $4Ha$, and since critical currents would be stored in all of the thin film rings, increasing the magnetic field intensity to 6H*a* would cause a voltage to be induced in the sensing coil 29. It should be understood that the sense voltage appears at a time $T_3$. If a greater value were stored in the element 20, a voltage would appear at an earlier time $T_2$ and thus indicate a higher value.

The other principles of operation of the embodiment of the invention shown in FIGURE 5 are similar to the embodiment of the invention shown in FIGURE 4.

It will be understood that the invention is not to be limited to the exact construction shown and described, but that various changes and modifications may be made without departing from the spirit and scope of the invention, as defined in the appended claims.

I claim:

1. The method of establishing a persistent supercurrent in a superconductive thin film ring, said thin superconductive film ring being characterized by a critical electron velocity which represents an electrical current which is less than the critical current, which comprises impressing upon the superconductive thin film ring a magnetic field substantially greater in intensity that that which is necessary to accelerate the electrons in the superconductive thin film ring to the critical electron velocity, and then decreasing the impressed magnetic field to apply a negative acceleration to the electrons in the superconductive thin film ring and decrease the electron velocity in the superconductive thin film ring to a value algebraically less than the critical electron velocity and establish a persistent supercurrent in the thin superconductive film.

2. The method of establishing a persistent supercurrent in a superconductive thin film ring, said superconductive film ring being characterized by a critical electron velocity which represents an electrical current which is less than the critical current, which comprises impressing upon the superconductive thin film ring a magnetic field which is substantially greater in intensity than that which is necessary to accelerate the electrons in the superconductive thin film ring to the critical electron velocity, and then decreasing the impressed magnetic field to essentially zero to apply a negative acceleration to the electrons in the superconductive thin film ring and generate in the superconductive thin film ring a flow of electrons in the direction opposite to the flow which had been established at the critical electron velocity, said flow of electrons representing a persistent supercurrent in the thin superconductive film.

3. The method of establishing a persistent supercurrent in a superconductive thin film ring, said superconductive thin film ring being characterized by a critical electron velocity which represents an electrical current which is less than the critical current, which comprises impressing upon the superconductive thin film ring a magnetic field at least twice as great in intensity as that required to accelerate the electrons in the superconductive thin film ring to the critical electron velocity and then decreasing the impressed magnetic field to essentially zero to apply a negative acceleration to the electrons in the superconductive thin film ring and generate in the superconductive thin film ring a flow of electrons in the direction opposite to the flow which had been established at the critical electron velocity, this opposite flow of electrons being at substantially the critical electron velocity and representing a persistent supercurrent in the thin superconductive film.

4. The method of establishing a persistent supercurrent in a superconductive thin film ring, said superconductive thin film ring being characterized by a critical electron velocity which represents an electrical current which is less than the critical current, which comprises impressing upon the superconductive thin film ring a magnetic field more than twice as great in intensity as that required to accelerate the electrons in the superconductive thin film ring to the critical electron velocity and then decreasing the impressed magnetic field to essentially zero to apply a negative acceleration to the electrons in the superconductive thin film ring and generate in the superconductive thin film ring a flow of electrons in the direction opposite to the flow which had been established at the critical electron velocity, this opposite flow of electrons being at substantially the critical electron velocity and representing a persistent supercurrent in the thin superconductive film.

References Cited by the Examiner

UNITED STATES PATENTS 3,007,057 10/1961 Brennemann et al. ---- 307—88.5

OTHER REFERENCES

"Trapped Flux Superconductive Memory," by Crowe. IBM Journal, pages 295–302, October 1957.

IRVING L. SRAGOW, *Primary Examiner.*

BERNARD KONICK, *Examiner.*

T. W. FEARS, *Assistant Examiner.*